US012711755B2

(12) United States Patent
Lochner et al.

(10) Patent No.: US 12,711,755 B2
(45) Date of Patent: Aug. 18, 2026

(54) ITEM RECOGNITION ENHANCEMENTS

(71) Applicant: TOSHIBA GLOBAL COMMERCE SOLUTIONS, INC., Durham, NC (US)

(72) Inventors: Terry A. Lochner, Elgin, SC (US); Soraya D. Brewer, West Fork, AR (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 123 days.

(21) Appl. No.: 18/401,219

(22) Filed: Dec. 29, 2023

(65) Prior Publication Data

US 2025/0218170 A1 Jul. 3, 2025

(51) Int. Cl.

| | |
|---|---|
| ***G06Q 20/18*** | (2012.01) |
| ***G06Q 20/20*** | (2012.01) |
| ***G06V 10/84*** | (2022.01) |
| ***G07G 1/00*** | (2006.01) |

(52) U.S. Cl.

CPC ............. *G06V 10/84* (2022.01); *G06Q 20/18* (2013.01); *G06Q 20/203* (2013.01); *G06Q 20/208* (2013.01); *G07G 1/0072* (2013.01)

(58) Field of Classification Search

CPC ............................ G06Q 20/18; G06Q 20/203

USPC ........................................................ 705/23

See application file for complete search history.

(56) References Cited

U.S. PATENT DOCUMENTS

| | | | | |
|---|---|---|---|---|
| 5,995,960 A * | 11/1999 | Lochner | G06F 11/3476 707/693 |
| 7,996,279 B1 * | 8/2011 | Katz | G06Q 10/025 705/26.7 |
| 8,898,169 B2 * | 11/2014 | Gokturk | G06F 16/954 707/740 |

(Continued)

FOREIGN PATENT DOCUMENTS

WO WO-2012064893 A2 * 5/2012 .......... G06F 16/954

OTHER PUBLICATIONS

Joh, Chang-Hyeon, Harry JP Timmermans, and Peter TL Popkowski-Leszczyc. "Identifying purchase-history sensitive shopper segments using scanner panel data and sequence alignment methods." Journal of retailing and consumer services 10.3 (2003): 135-144. (Year: 2003).*

(Continued)

*Primary Examiner* — Virpi H Kanervo

(74) *Attorney, Agent, or Firm* — Patterson + Sheridan, LLP; Gero G. McClellan

(57) ABSTRACT

The present disclosure describes a system and method for identifying an item. The system includes a camera that captures a first image of a first item being purchased by a user, a memory, and a processor. The processor determines, based on the first image, a first probability for a first identity of the first item and a second probability for a second identity of the first item and in response to determining that both the first probability and the second probability are below a threshold, determines, based on a shopping history of the user, that the user previously purchased a second item (Continued)

comprising a characteristic. The processor also applies a first weight to the first probability and a second weight to the second probability based on the characteristic, and assigns the first identity to the first item based on the first weighted probability and the second weighted probability.

20 Claims, 8 Drawing Sheets

(56) References Cited

U.S. PATENT DOCUMENTS

| | | | | |
|---|---|---|---|---|
| 10,984,239 | B2 * | 4/2021 | Zucker | G06V 20/52 |
| 12,205,098 | B2 * | 1/2025 | Huang | G06V 10/803 |
| 2007/0124110 | A1 * | 5/2007 | Tung | G06F 16/31 702/179 |
| 2018/0300643 | A1 * | 10/2018 | Morimura | G06N 7/01 |
| 2020/0104593 | A1 * | 4/2020 | Zucker | G06V 20/10 |
| 2021/0304173 | A1 * | 9/2021 | Rodriguez | G07G 3/003 |
| 2023/0100437 | A1 * | 3/2023 | Brosnan | G06Q 20/322 705/16 |
| 2024/0013184 | A1 * | 1/2024 | Huang | G01G 19/4144 |
| 2024/0020859 | A1 * | 1/2024 | Krishnamurthy | G06T 7/292 |

OTHER PUBLICATIONS

N. Khanna, A. K. Mikkilineni and E. J. Delp, "Scanner Identification Using Feature-Based Processing and Analysis," in IEEE Transactions on Information Forensics and Security, vol. 4, No. 1, pp. 123-139, Mar. 2009. (Year: 2009).*

* cited by examiner

ITEM RECOGNITION ENHANCEMENTS

BACKGROUND

The present disclosure relates to item recognition techniques. Physical stores have been implementing item recognition systems to reduce shrink (e.g., theft, loss, incorrect pricing, etc.) of items at self-checkout stations. These systems capture images of items being purchased to identify the items and to determine whether a user is attempting to trick the checkout station into charging for different items than the items the user is purchasing. These systems, however, rely primarily on the size, shape, and color of items to identify the items, which makes it difficult for the system to distinguish between certain classes of items (e.g., regular vs. organic produce, different brands of items, and different quantities of items). As a result, these systems may misidentify items, which results in shrink.

DETAILED DESCRIPTION

Physical stores have been implementing item recognition systems to reduce shrink (e.g., theft, loss, incorrect pricing, etc.) of items at self-checkout stations. These systems, however, rely primarily on the size, shape, and color of items to identify the items, which makes it difficult for the system to distinguish between certain classes of items (e.g., regular vs. organic produce, different brands of items, and different quantities of items). As a result, these systems may misidentify items, which results in shrink.

The present disclosure describes an item recognition system that uses other information to improve or enhance the item recognition process. When a user attempts to purchase an item, the system captures an image of the item. The system then analyzes the image as well as the user's shopping history to identify the item. For example, the image alone may not allow the system to determine whether the item is a regular or organic item. The system may determine from the user's shopping history that the user tends to purchase organic items rather than regular items. In response, the system may identify the item being purchased as an organic item rather than a regular item.

In certain embodiments, the system provides several technical advantages. For example, the system may improve the accuracy of an item identification or reduce the chances that the system misidentifies an item. By supplementing the image of the item with the shopping history of the user, the system considers additional information, which may improve the accuracy of the item identification. As another example, the system may improve the functioning of a computer system. By considering additional information when identifying the item, the system reduces the chances of misidentifying the item, which typically requires additional input from the user or another associate to correct, consuming additional processor resources and requiring additional electrical power. As a result, the system reduces the amount of processor resources and power consumption, which is an improvement to the functioning of a computer system.

Figure 1:
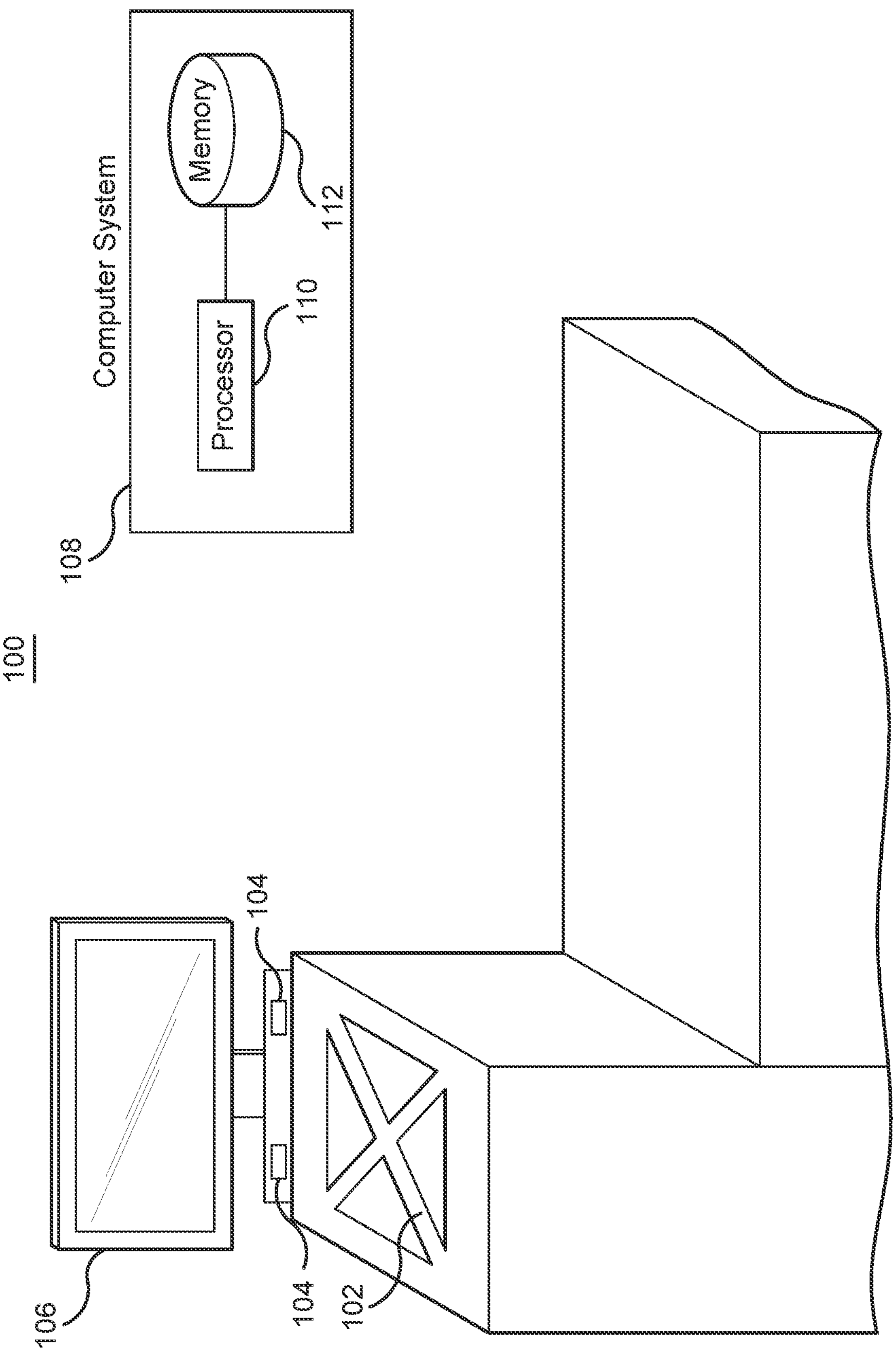
FIG. 1 illustrates an example system.

FIG. 1 illustrates an example system 100. Generally, the system 100 may be a self-checkout system. As seen in FIG. 1, the system 100 includes a scanner 102, one or more cameras 104, a display 106, and a computer system 108. Generally, the scanner 102 is used to scan a barcode on an item. The system 100 may then identify the item based on the scanned barcode and add the item to a transaction. The display 106 may indicate the item that is added to the transaction. Malicious users may try to trick or deceive the system 100 into determining that the users are purchasing items that have lower prices than the items that the users are actually purchasing. For example, these users may take barcodes from cheaper items and try to scan those barcodes instead of the barcodes that are affixed to the items that the users are actually trying to purchase.

To counter this malicious behavior, the system 100 uses the cameras 104 to capture images of an item as the item is being scanned. The system 100 may then use computer vision techniques to identify the item from the image. The image identification may serve as an extra check on whether the user has scanned the correct barcode. These computer vision techniques, however, are not foolproof. Typically, these techniques rely primarily on shapes, sizes, and colors to distinguish or identify items. Some items, however, share the same shapes, sizes, and/or colors. As a result, these techniques may not determine when a user scanned an incorrect barcode if the items share similar shapes, sizes, and/or colors. For example, it may be difficult for the system to distinguish between two boxed items when the boxes have similar shapes, sizes, and/or colors. As another example, it may be difficult for the system to distinguish between a regular produce item and an organic produce item that looks similar to the regular produce item.

Generally, the system 100 augments the computer vision techniques with other information that helps in identifying an item shown in the image captured by the cameras 104. For example, the system 100 may analyze a user's purchase history to determine the items that a user has purchased or tends to purchase. The system may then use this information to identify an item as an item that the user previously purchased as opposed to an item that the user has never purchased. As another example, the system 100 may analyze other information (e.g., inventory counts in a store or expiration dates of items in a store) to identify an item. In this manner, the system 100 produces a more accurate identification for the item, which may reduce shrink.

The computer system 108 may be integrated with or separate from the checkout system. The computer system 108 may be in communication with the checkout system. Generally, the computer system 108 may assist in identifying items that are scanned by the scanners 102. For example, the computer system 108 may use computer vision techniques as well as other information (e.g., a user's purchase history) to identify an item. As seen in FIG. 1, the computer system 108 includes a processor 110 and a memory 112 that are arranged to perform the functions or actions of the computer system 108 described herein.

The processor 110 is any electronic circuitry, including, but not limited to one or a combination of microprocessors, microcontrollers, application specific integrated circuits (ASIC), application specific instruction set processor (ASIP), and/or state machines, that communicatively couples to the memory 112 and controls the operation of the computer system 108. The processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 110 may include other hardware that operates software to control and process information. The processor 110 executes software stored on the memory 112 to perform any of the functions described herein. The processor 110 controls the operation and administration of the computer system 108 by processing information (e.g., information received from the checkout system and memory 112). The processor 110 is not limited to a single processing device and may encompass multiple processing devices contained in the same device or computer or distributed across multiple devices or computers. The processor 110 is considered to perform a set of functions or actions if the multiple processing devices collectively perform the set of functions or actions, even if different processing devices perform different functions or actions in the set.

The memory 112 may store, either permanently or temporarily, data, operational software, or other information for the processor 110. The memory 112 may include any one or a combination of volatile or non-volatile local or remote devices suitable for storing information. For example, the memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 112, a disk, a CD, or a flash drive. In particular embodiments, the software may include an application executable by the processor 110 to perform one or more of the functions described herein. The memory 112 is not limited to a single memory and may encompass multiple memories contained in the same device or computer or distributed across multiple devices or computers. The memory 112 is considered to store a set of data, operational software, or information if the multiple memories collectively store the set of data, operational software, or information, even if different memories store different portions of the data, operational software, or information in the set.

Figure 2:
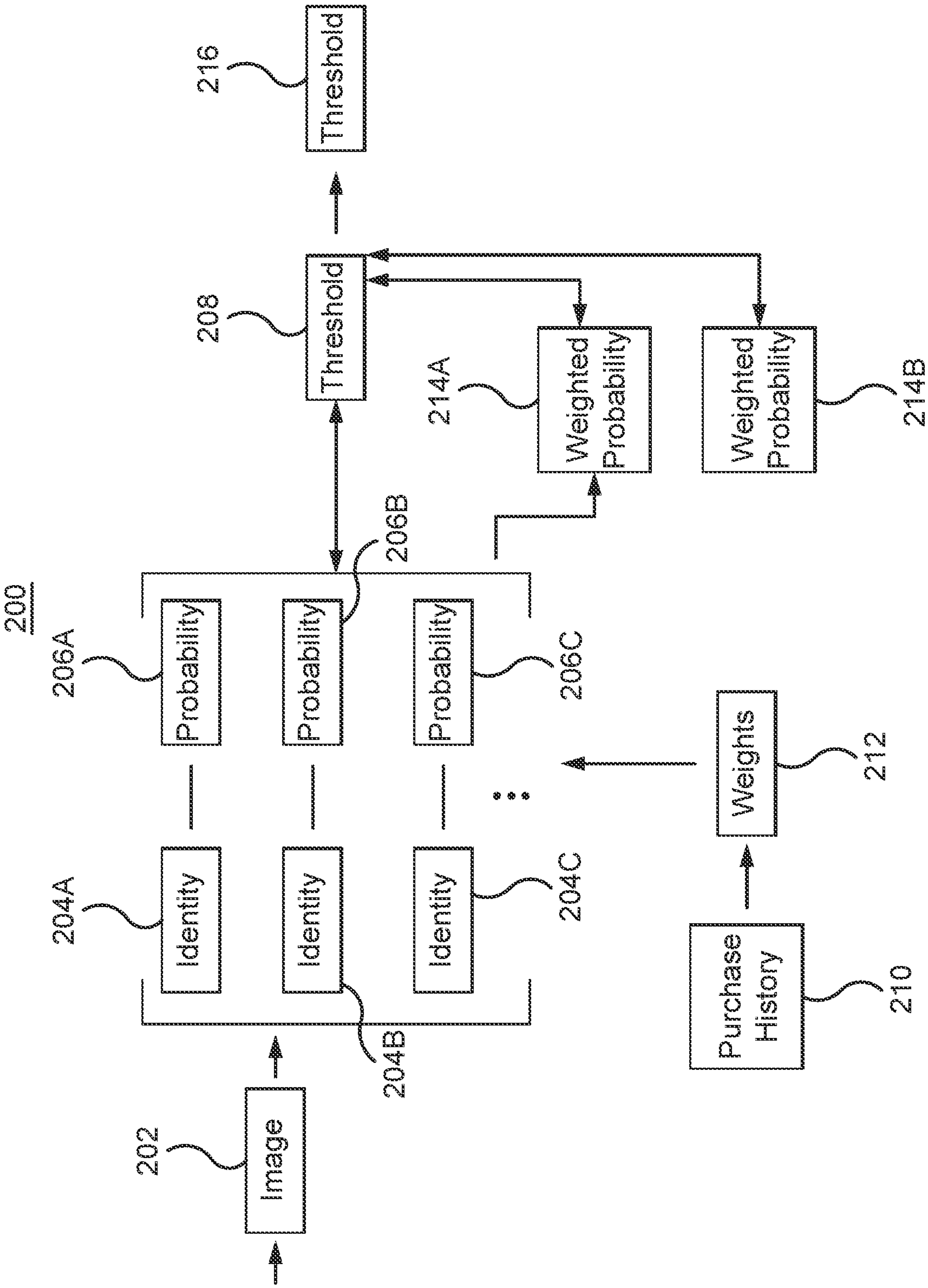
FIG. 2 illustrates an example operation for identifying an item performed by the system of FIG. 1.

FIG. 2 illustrates an example operation 200 for identifying an item performed by the system 100 of FIG. 1. In particular embodiments, the computer system 108 performs the operation 200. By performing the operation 200, the computer system 108 identifies an item using the image of the item and other information about a user attempting to purchase the item.

The computer system 108 receives an image 202 of an item. The image 202 may have been captured by one or more cameras 104 in the system 100 when a user was attempting to purchase the item. The image 202 may show the appearance of the item (e.g., the shape, size, or color of the item). The computer system 108 may use the image 202 to identify the item.

The computer system 108 determines one or more potential identities 204 for the item based on the appearance of the item in the image 202. The computer system 108 uses any technique (e.g., computer vision techniques) to determine the potential identities 204 from the image 202. In the example of FIG. 2, the computer system 108 determines the identities 204A, 204B, and 204C as potential identities for the item shown in the image 202. The computer system 108 also determines probabilities 206 for each of the identities 204. The probability 206 for an identity 204 indicates the likelihood that the identity 204 is the correct identity of the item shown in the image 202. In the example of FIG. 2, the computer system 108 determines the probabilities 206A, 206B, and 206C for the identities 204A, 204B, and 204C, respectively.

The computer system 108 compares each of the probabilities 206 against a threshold 208. The threshold 208 may indicate a minimum probability. If the probability 206 for an identity 204 does not exceed the minimum probability, then the computer system 108 may not consider that identity 204 as a potential identity for the item shown in the image 202. By comparing each of the probabilities 206 against the threshold 208, the computer system 108 may eliminate one or more identities 204 as potential identities for the items shown in the image 202. The computer system 108 may also determine one or more identities 204 that may be potential identities for the item shown in the image 202 because those identities 204 have probabilities 206 that exceed the threshold 208. As an example, if the threshold 208 is set at 60%, then each identity 204 with a probability 206 that does not exceed 60% may be eliminated as potential identifies for the item shown in the image 202. Additionally, each identity 204 with a probability 206 that exceeds 60% may be kept as a potential identity for the item shown in the image 202.

The computer system 108 uses information about the user who is attempting to purchase the item shown in the image 202 to augment the identification of the item. In the example of FIG. 2, the computer system 108 retrieves a purchase history 210 for the user. The purchase history 210 may be stored with a profile of the user. The user may be identified in any manner (e.g., when the user scans an identification tag or a loyalty tag during the checkout process). When the user is identified, the computer system 108 retrieves the purchase history 210 that is linked or stored with the profile of the identified user. The purchase history 210 may indicate the items that the user has previously purchased and/or returned. The computer system 108 may analyze the purchase history 210 to further determine the tendencies of the user (e.g., the items that the user tends to purchase or tends to return).

The computer system 108 determines one or more weights 212 (e.g., probability weights) using the purchase history 210 for the user. The weights 212 may be determined based on the previous shopping history of the user (e.g., how many times the user had previously purchased certain items or certain types of items). For example, an item may receive a greater weight 212 the more the user has previously purchased the item. An item may receive a lesser weight 212 the fewer times the user has purchased the item. As another example, a class of items (e.g., organic items or a certain brand) may receive a greater weight 212 the more items from that class the user has previously purchased. The class of items may receive a lower weight 212 the fewer items from that class the user has previously purchased. As yet another example, an item may receive a lower weight 212 the more times the user has returned that item after purchasing the item. An item may receive a greater weight 212 the more times the user has kept the item after purchasing the item.

The computer system 108 applies the weights 212 (e.g., probability weights) to the probabilities 206 to produce weighted probabilities 214. In some embodiments, the computer system 108 applies the weights 212 to the probabilities 206 by multiplying the probabilities 206 by the weights 212 to produce the weighted probabilities 214. In the example of FIG. 2, the computer system 108 may have determined that the probabilities 206A and 206B exceed the threshold 208. The computer system 108 then applies appropriate weights 212 to the probabilities 206A and 206B. For example, the computer system 108 may apply weights 212 to the probability 206A if those weights 212 are for items or classes of items that apply to the identity 204A. Likewise, the computer system 108 may apply weights 212 to the probability 206B if those weights 212 are for items or classes of items that apply to the identity 204B. In the example of FIG. 2, the computer system 108 applies the appropriate weights 212 to the probabilities 206A and 206B to produce the weighted probabilities 214A and 214B, respectively.

The computer system 108 then compares the weighted probabilities 214 against the threshold 208 to determine an identity 216 for the item shown in the image 202. Using the example of FIG. 2, the computer system 108 compares the weighted probabilities 214A and 214B against the threshold 208. If the weighted probability 214A exceeds the threshold 208 and the weighted probability 214B falls below threshold 208, then the computer system 108 may determine the identity 204A as the identity 216 for the item shown in the image 202. If the weighted probability 214B exceeds the threshold 208 and the weighted probability 214A falls below the threshold 208, then the computer system 108 may determine the identity 204B as the identity 216 for the item shown in the image 202. If both the weighted probabilities 214A and 214B exceed the threshold 208 or fall below the threshold 208, then the computer system 108 may select the identity 204A or 204B as the identity 216 for the item shown in the image 202 based on which of the weighted probabilities 214A or 214B is greater. In some embodiments, the computer system 108 instead asks the user or a store associate to select the identity 204A or the identity 204B as the identity 216. In this manner, the computer system 108 determines the identity 216 using the image 202 and the purchase history 210.

Figure 3:
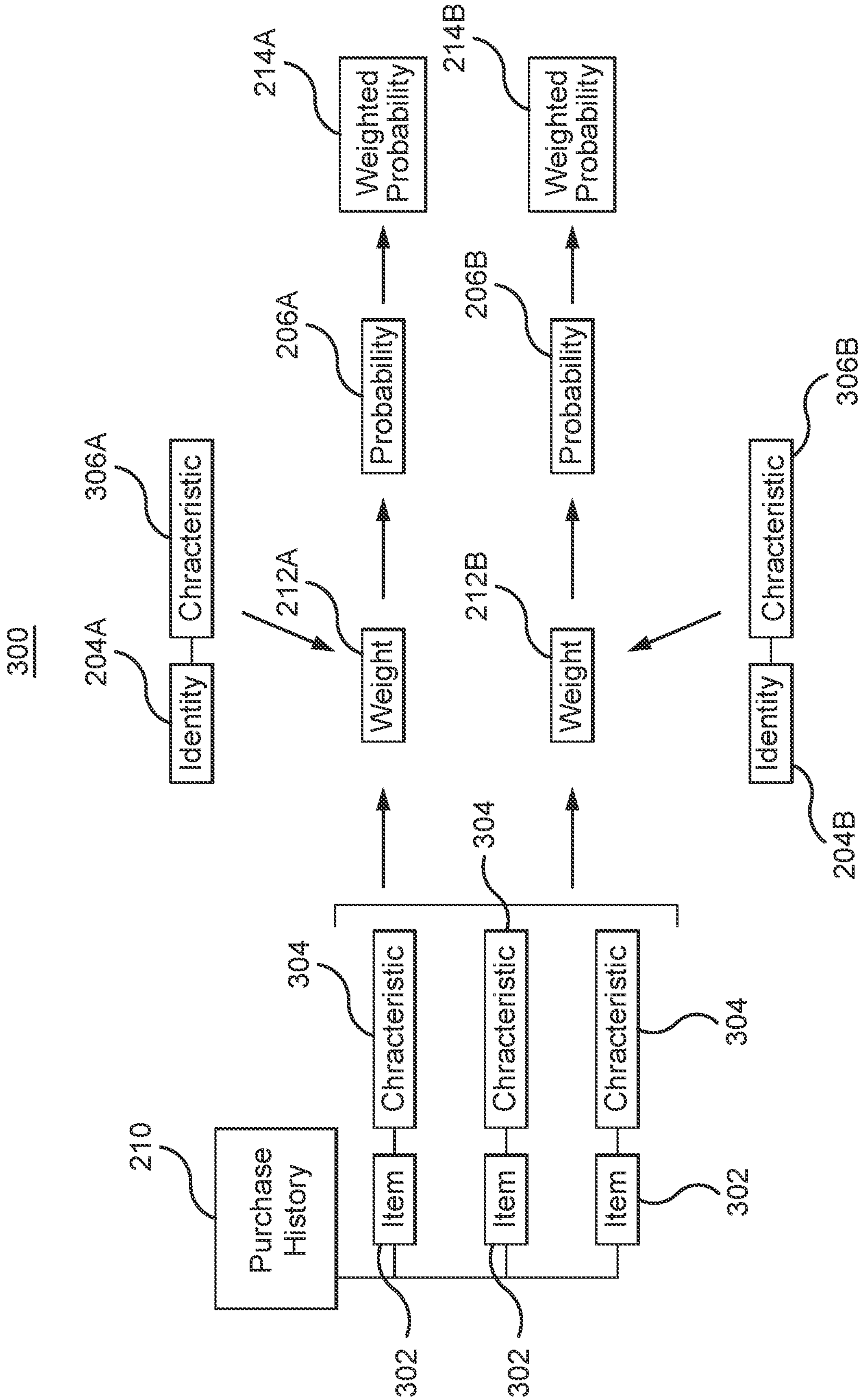
FIG. 3 illustrates an example operation for determining a weighted probability performed by the system of FIG. 1.

FIG. 3 illustrates an example operation 300 for determining a weighted probability 214 performed by the system 100 of FIG. 1. In particular embodiments, the computer system 108 performs the operation 300. By performing the operation 300, the computer system 108 determines weighted probabilities 214 using the purchase history 210 for the user.

The computer system 108 begins by retrieving the purchase history 210 for the user. The user may have been identified when the user scanned an identification tag or loyalty tag during the checkout process. The computer system 108 retrieves the purchase history 210 for the identity. As seen in FIG. 3, the purchase history 210 indicates the items 302 previously purchased by the user. The purchase history 210 also indicates characteristics 304 for those items 302. For example, the characteristics 304 may indicate which items 302 are regular items or organic items. As another example, the characteristics 304 may indicate the expiration dates for the items 302. As yet another example, the characteristics 304 may indicate a brand for the items 302.

The computer system 108 determines one or more weights 212 (e.g., probability weights) from the purchase history 210. In the example of FIG. 3, the computer system 108 determines a weight 212A and a weight 212B from the purchase history 210. Each weight 212 may be determined based on the number of times that the user previously purchased an item 302 or the number of times that the user previously purchased items 302 that share a common characteristic 304. The more times the user previously purchased and kept the item 302 or the items 302 that share the common characteristic 304, the greater the weight 212. The more times the user returned the item 302 or items 302 that share the common characteristic 304, the lower the weight 212.

The computer system 108 then determines whether to apply the weights 212 (e.g., probability weights) to certain probabilities 206. For example, the computer system 108 may determine whether the identities 204 match the item 302 for the weight 212. If the identity 204 matches the item 302 for the weight 212, then the computer system 108 may determine that the weight 212 should be applied to the probability 206 for the identity 204. As another example, the computer system 108 may determine characteristics 306 (e.g., organic vs. regular, brand, etc.) for each identity 204. The computer system 108 may determine whether the weight 212 is for items 302 that share a common characteristic 304 that matches the characteristic 306. If the common characteristic 304 matches the characteristic 306, then the computer system 108 may determine that the weight 212 should be applied to the probability 206 for that identity 204. In the example of FIG. 3, the computer system 108 determines that the weight 212A is for an item 302 that matches the identity 204A or is for items 302 that share a common characteristic 304 that matches the characteristic 306A for the identity of 204A. In response, the computer system 108 determines that the weight 212A should be applied to the probability 206A. Additionally, the computer system 108 determines that the weight 212B is for an item 302 that matches the identity 204B or is for items 302 that share a common characteristic 304 that matches the characteristic 306B for the identity 204B. In response, the computer system 108 determines that the weight 212B should be applied to the probability 206B for the identity 204B.

Applying the weight 212A to the probability 206A produces the weighted probability 214A. Applying the weight 212B to the probability 206B produces the weighted probability 214B. In this manner, the weighted probabilities 214A and 214B reflect the probabilities 206A and 206B after taking into consideration the purchase history 210 of the user.

Figure 4:
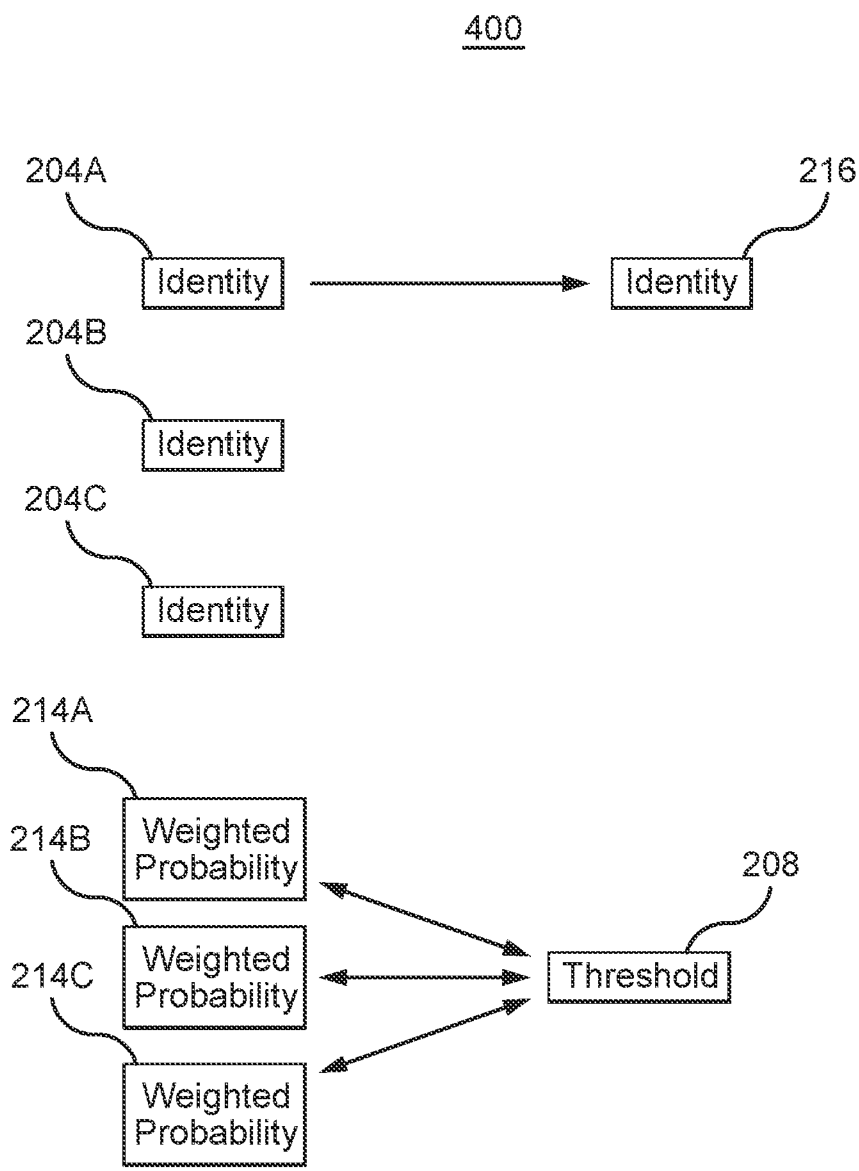
FIG. 4 illustrates an example operation for identifying an item performed by the system of FIG. 1.

FIG. 4 illustrates an example operation 400 for identifying an item performed by the system 100 of FIG. 1. In particular embodiments, the computer system 108 performs the operation 400. By performing the operation 400, the computer system 108 uses weighted probabilities 214 to identify an item.

As seen in FIG. 4, the computer system 108 determined the weighted probabilities 214A, 214B, and 214C. Each of these weighted probabilities 214 may take into consideration the previous purchase of an item 302 or the previous purchases of items 302 that share a common characteristic 304. The computer system 108 compares each of the weighted probabilities 214A, 214B, and 214C to the threshold 208. If a weighted probability 214 falls below the threshold 208, the computer system 108 may eliminate the identity 204 for that weighted probability 214 from being the identity 216 of the item shown in the image 202. If multiple weighted probabilities 214 exceed the threshold 208, then the computer system 108 may select the identity 204 for the greatest of those weighted probabilities 214. In some embodiments, the computer system 108 requests the user or a store associate to select the identity 204 from the identities 204 with the weighted probabilities 214 that exceed the threshold 208. In the example of FIG. 4, the computer system 108 selects the identity 204A as the identity 216 for the items shown in the image 202. The computer system 108 may have selected the identity 204A in response to determining that the weighted probability 214A exceeds the threshold 208 and/or that the weighted probability 214A is greater than the weighted probabilities 214B and 214C.

After determining the identity 216 for the item, the computer system 108 may add the identified item to the transaction, and the computer system 108 may also add the cost of the identified item to the transaction. The user may then pay for the transaction and purchase the item.

Figure 5:
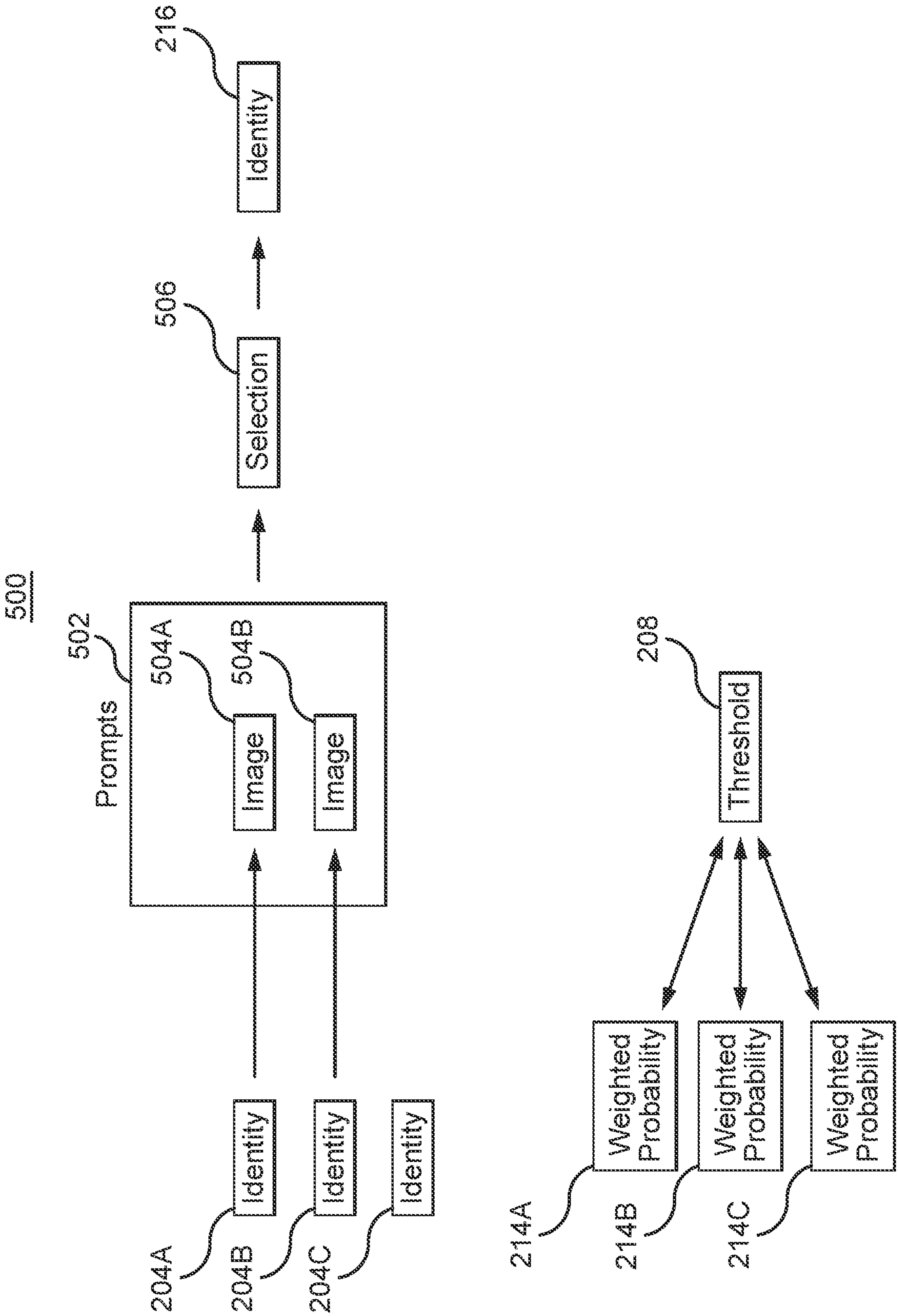
FIG. 5 illustrates an example operation for identifying an item performed by the system of FIG. 1.

FIG. 5 illustrates an example operation 500 for identifying an item performed by the system 100 of FIG. 1. In particular embodiments, the computer system 108 performs the operation 500. By performing the operation 500, the computer system 108 provides an additional feature for identifying an item when multiple items have weighted probabilities 214 that exceed the threshold 208.

The computer system 108 compares multiple weighted probabilities 214 with the threshold 208. In the example of FIG. 5, the computer system 108 compares the weighted probabilities 214A, 214B, and 214C with the threshold 208. Multiple of these weighted probabilities 214 may exceed the threshold 208. For example, the weighted probabilities 214A and 214B may both exceed the threshold 208. As a result, the computer system 108 determines that the identities 204A and 204B remain as potential identities for the item shown in the image 202.

The computer system 108 may present a prompt 502 to ask the user or a store associate to identify the item. The computer system 108 may present the prompt 502 on the display 106. The prompt 502 may include images 504 for the identities 204. In the example of FIG. 5, the prompt 502 includes the images 504A and 504B for the identities 204A and 204B. The image 504A may show a picture of the item for the identity 204A. The image 504B may show the item for the identity 204B. The computer system 108 may not include an image 504 for the identity 204C, because the weighted probability 214C falls below the threshold 208.

The user or store associate may make a selection 506 to select one of the images 504A or 504B in the prompt 502. After making the selection 506, the computer system 108 determines the identity 216 of the item to be the identity 204 shown in the selected image 504A or 504B. The computer system 108 may then add the identified item to the transaction. In this manner, the computer system 108 allows a user or a store associate to identify the item when the weighted probabilities 214 allow for multiple potential identities. The computer system 108 may reduce the number of images 504 included in the prompt 502 by first eliminating identities 204 based on whether their weighted probabilities 214 fall below the threshold 208, which simplifies the identification task for the user or store associate.

Figure 6:
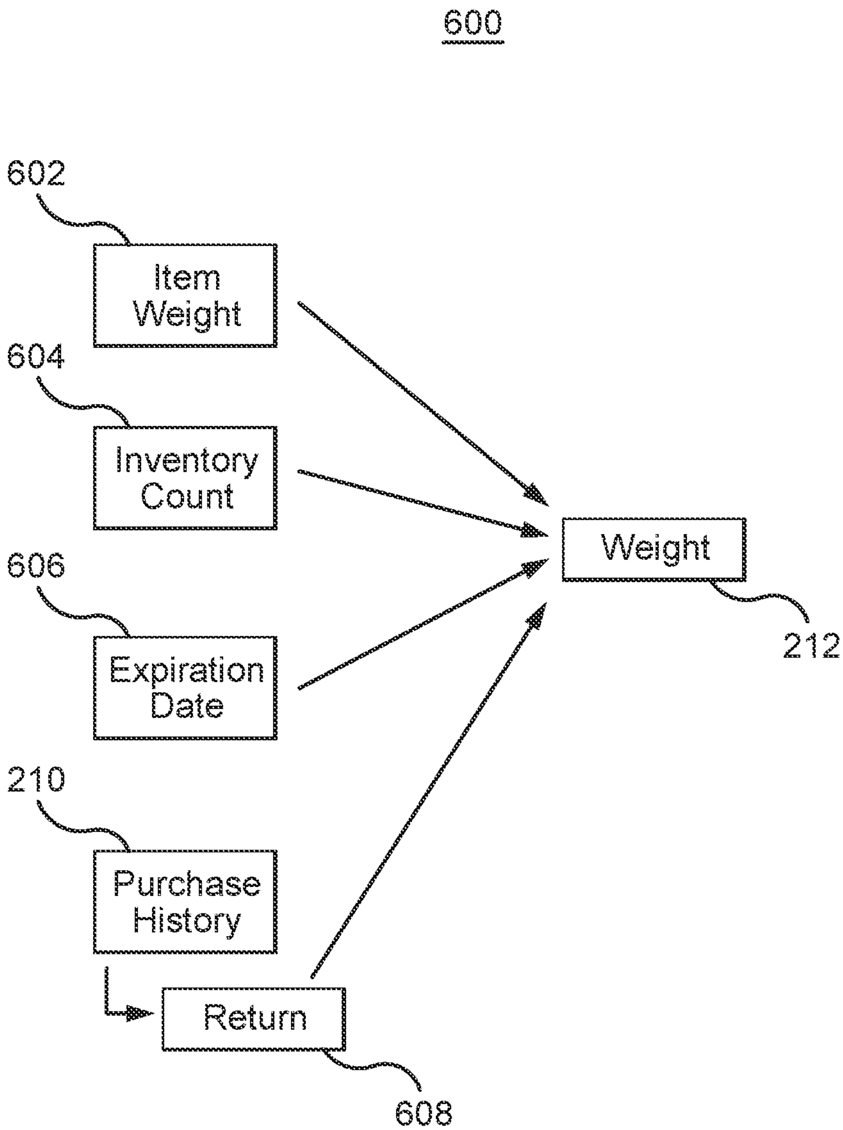
FIG. 6 illustrates an example operation for determining a weight performed by the system of FIG. 1.

FIG. 6 illustrates an example of operation 600 for determining the weight 212 (e.g., probability weight) performed by the system 100 of FIG. 1. In particular embodiments, the computer system 108 performs the operation 600. By performing the operation 600, the computer system 108 considers other factors or information when determining the weight 212.

The computer system 108 may consider any information when determining the weight 212 (e.g., probability weight) to apply to a probability 206. In the example of FIG. 6, the computer system 108 considers item weights 602 (e.g., the physical weight of items), inventory counts 604, expiration dates 606, and/or returns 608 indicated in the purchase history 210 when determining the weight 212 (e.g., the probability weight). The item weights 602 may be the physical weights of items 302 or of items 302 that share a common characteristic 304. The computer system 108 may adjust the weight 212 (e.g., probability weight) for an item 302 or items 302 that share a common characteristic 304 based on how close the measured weight (e.g., physical weight) of an item that is being purchased is to the item weight 602 (e.g., physical weight) for the item 302 or items 302 that share the common characteristic 304. For example, some organic items may have an item weight 602 (e.g., physical weight) that is less than the item weight 602 (e.g., physical weight) for a regular version of that item. If the weight of an item that is being purchased is less than the weight 602 for regular items, the computer system 108 may determine a greater weight 212 (e.g., probability weight) for an organic item and a lower weight 212 (e.g., probability weight) for a regular item.

The computer system 108 may consider inventory counts 604 (which may be retrieved from an inventory system of the store) when determining the weight 212 (e.g., probability weight). Each inventory count 604 may indicate a number of a particular item remaining in a store. The computer system 108 may determine a greater weight 212 for an item 302 when that item 302 has a higher inventory count 604. The larger inventory count 604 may indicate a higher probability that a user took that item 302 from the shelf. As a result, the computer system 108 may determine a greater weight 212 for a larger inventory count 604. As another example, a lower inventory count 604 may indicate a lower probability that the user removed the item 302 from the shelf. As a result the computer system 108 may determine a lower weight 212 for a lower inventory count 604. In some embodiments, the computer system 108 determines the opposite (e.g., a greater weight 212 for a lower inventory count 604 (popular item) and a lower weight 212 for a greater inventory count 604 (unpopular item)).

The computer system 108 may consider the expiration date 606 (which may be retrieved from an inventory system of the store) when determining the weight 212 (e.g., probability weight). The computer system 108 may determine (e.g., from the purchase history 210) that the user is less likely to purchase items that are close to their expiration dates. As a result, the computer system 108 may determine a greater weight 212 when the expiration date 606 for an item 302 is further out and a lower weight 212 when the expiration date 606 for an item 302 is close.

The computer system 108 considers the return 608 of items indicated in the purchase history 210 when determining the weight 212 (e.g., probability weight). The return 608 may indicate that the user returned a previously purchased item. The computer system 108 may weigh the return 608 negatively against the weight 212. As a result, the computer system 108 may determine a greater weight 212 when an item 302 has not been returned and a lower weight 212 when the item 302 was previously returned.

Figure 7:
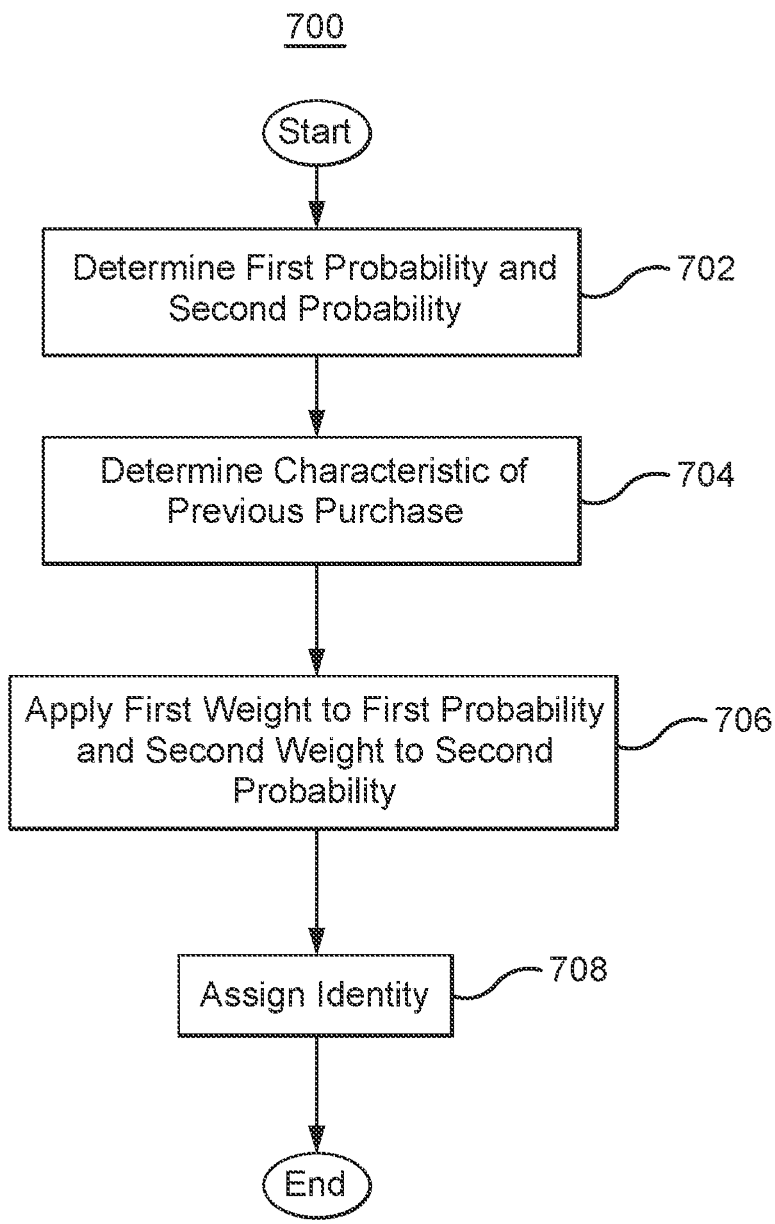
FIG. 7 is a flowchart of an example method performed in the system of FIG. 1.

FIG. 7 is a flowchart of an example method 700 performed in the system 100 of FIG. 1. In particular embodiments, the computer system 108 performs the method 700. By performing the method 700, the computer system 108 identifies items using an image recognition technique, and information about a user attempting to purchase the item.

In block 702, the computer system 108 determines a first probability 206A and a second probability 206B. The first probability 206A may indicate a likelihood that a user purchased an item with an identity 204A. The second probability 206B indicates a likelihood that the user purchased an item with the identity 204B. The computer system 108 have determined these probabilities 206 by analyzing an image 202 of an item that was being scanned for purchase. For example, the computer system 108 may consider the size, shape, and/or color of the item in the image 202 to determine the probabilities 206 for the identities 204.

In block 704, the computer system 108 determines characteristics 304 of a previous purchase. The computer system 108 may use information in the purchase history 210 of the user to determine the characteristics 304 of the previous purchase. The characteristics 304 may reveal any suitable information about the items 302 in the previous purchase. For example, the characteristics 304 may indicate a brand, color, organic status, etc. of the previous purchase.

The computer system 108 may determine weights 212 (e.g., probability weights) for the items 302 in the previous purchase. The weights may apply to singular items 302 or to multiple items 302 that share common characteristics 304. In block 706, the computer system 108 applies a first weight 212A to the first probability 206A and a second weight 212B to the second probability 206B to produce weighted probabilities 214A and 214B. In some embodiments, the computer system 108 applies the weights 212 by multiplying the probabilities 206 by the corresponding weights 212 to produce the weighted probabilities 214.

In block 708, the computer system 108 assigns the identity 216 to the item. The computer system 108 may determine the identity 216 by comparing the weighted probabilities 214 with the threshold 208. If one of the weighted probabilities 214 exceeds a threshold 208 and the other weighted probabilities 214 fall below the threshold 208, then the computer system 108 may determine the identity 216 to be the identity 204 for the weighted probability 214 that exceeded the threshold 208. If multiple weighted probabilities 214 exceed the threshold 208, then the computer system 108 may present a prompt 502 for the user or a store associate to select the identity 216 for the item.

Figure 8:
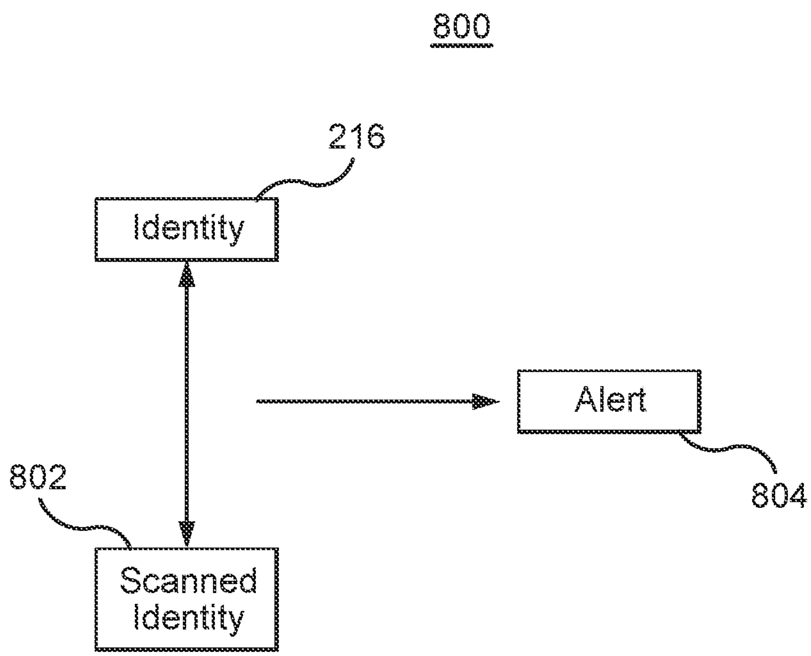
FIG. 8 illustrates an example operation for identifying an item performed by the system of FIG. 1.

FIG. 8 illustrates an example operation 800 for identifying an item performed by the system 100 of FIG. 1. In particular embodiments, the computer system 108 performs the operation 800. By performing the operation 800, the computer system 108 responds to a misidentified item.

After the computer system 108 determines the identity 216 of the item, the computer system 108 may compare the determined identity 216 with a scanned identity 802. The scanned identity 802 may be the identity of the item indicated by a scanned bar code. The computer system 108 may determine whether the determined identity 216 matches the scanned identity 802. If the identity 216 and the scanned identity 802 do not match, the computer system 108 communicates an alert 804 indicating the mismatched identity. The alert 804 may signal a store associate to review the purchase to determine whether a misidentification happened. The mismatching identity may be evidence of attempted shrink, which the store associate should resolve. In this manner, the computer system 108 detects attempted shrink, using image recognition techniques and information about the user.

In a first example operation, a user scans a produce item (e.g., using the scanner 102). The cameras 104 capture an image 202 of the produce item. The computer system 108 uses computer vision techniques to analyze the image 202 to determine that the produce item is either a regular banana or an organic banana. The computer system 108 may determine that both the probability 206 that the produce item is a regular banana and the probability 206 that the produce item is an organic banana exceed the threshold 208. The computer system 108 then reviews the purchase history 210 of the user, which shows that the user previously purchased organic bananas rather than regular bananas. In response, the computer system 108 determines a large weight 212 (e.g., probability weight) for organic bananas and a low weight 212 (e.g., probability weight) for regular bananas. The computer system 108 then applies the large weight 212 to the probability 206 for organic bananas and the low weight 212 to the probability 206 for regular bananas. The computer system 108 compares the resulting weighted probabilities 214 to the threshold 208 and determines that the weighted probability 214 for the organic bananas exceeds the threshold 208 and the weighted probability 214 for the regular bananas falls below the threshold 208. In response, the computer system determines that the user is attempting to purchase organic bananas.

In a second example operation, a user scans a boxed item. The cameras 104 capture an image 202 of the boxed item. The computer system 108 uses computer vision techniques to analyze the image 202 to determine that the boxed item is either of a first brand or a second brand. The computer system 108 may determine that both the probability 206 that the boxed item is of the first brand and the probability 206 that boxed item is of the second brand exceed the threshold 208. The computer system 108 then reviews the purchase history 210 of the user, which shows that the user previously purchased items 302 produced by the second brand rather than items 302 produced by the first brand. In response, the computer system 108 determines a large weight 212 (e.g., probability weight) for items 302 of the second brand and a low weight 212 (e.g., probability weight) for items 302 of the first brand. The computer system 108 then applies the large weight 212 to the probability 206 for the first brand and the low weight 212 to the probability 206 for the second brand. The computer system 108 compares the resulting weighted probabilities 214 to the threshold 208 and determines that the weighted probability 214 for the second brand exceeds the threshold 208 and the weighted probability 214 for the first brand falls below the threshold 208. In response, the computer system determines that the user is attempting to purchase an item produced by the second brand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments may be devised without departing from the basic scope thereof, and the scope thereof is determined by the claims that follow.

What is claimed is:

1. A system comprising:

a scanner configured to scan an identifier on a first item;

a camera configured to capture a first image of the first item as the scanner is scanning the identifier on the first item;

a memory; and one or more processors communicatively coupled to the memory, a combination of the one or more processors configured to:

obtain a scanned identity of the first item based, at least in part, on the scanner scanning the identifier on the first item;

extract information about the first item from the first image of the first item;

determine, based on the information about the first item, a first probability for a first identity of the first item and a second probability for a second identity of the first item;

in response to determining that both the first probability and the second probability are below a threshold, determine, based on a shopping history of a user purchasing the first item, that the user previously purchased a second item comprising a characteristic;

apply a first weight to the first probability based on the characteristic to produce a first weighted probability;

apply a second weight to the second probability based on the characteristic to produce a second weighted probability;

assign the first identity as a predicted identity of the first item based on the first weighted probability and the second weighted probability;

determine a mismatch between the scanned identity of the first item and the predicted identity of the first item;

generate an alert indicating the mismatch between the scanned identity of the first item and the predicted identity of the first item; and display the alert on a display device for viewing by one or more persons.

2. The system of claim 1, wherein applying the first weight to the first probability is based on the first identity having the characteristic.

3. The system of claim 2, wherein applying the second weight to the second probability is based on the second identity lacking the characteristic.

4. The system of claim 1, wherein assigning the first identity as the predicted identity of the first item is in response to determining that (i) the first weighted probability exceeds the threshold and (ii) the second weighted probability falls below the threshold.

5. The system of claim 1, wherein the combination of the one or more processors is further configured to:

determine, based on the first image of the first item, a third probability for a third identity of the first item;

apply a third weight to the third probability based on the characteristic to produce a third weighted probability; and in response to determining that both the first weighted probability and the third weighted probability exceed the threshold, prompt the user to select the first identity or the third identity, wherein assigning the first identity as the predicted identity of the first item is further based on the user selecting the first identity rather than the third identity.

6. The system of claim 5, wherein prompting the user comprises presenting, to the user, a second image for the first identity and a third image for the third identity.

7. The system of claim 6, wherein the first image and the third image are presented in an order based on the first weighted probability and the third weighted probability.

8. The system of claim 5, wherein prompting the user further comprises refraining from presenting, to the user, a fourth image for the second identity in response to determining that the second weighted probability falls below the threshold.

9. The system of claim 1, wherein assigning the first identity as the predicted identity of the first item is further based on at least one of a weight of the first item, an inventory count, or an expiration date.

10. The system of claim 1, wherein applying the second weight to the second probability is further based on the shopping history indicating that the user returned the second item.

11. A method comprising:

obtaining, by one or more processors, a scanned identity of a first item based, at least in part, on scanning an identifier on the first item;

capturing, by a camera, a first image of the first item as the identifier on the first item is being scanned;

extracting, by the one or more processors, information about the first item from the first image;

determining, by the one or more processors and based on the information about the first item, a first probability for a first identity of the first item and a second probability for a second identity of the first item;

in response to determining that both the first probability and the second probability are below a threshold, determining, by the one or more processors and based on a shopping history of a user purchasing the first item, that the user purchasing the first item previously purchased a second item comprising a characteristic;

applying, by the one or more processors, a first weight to the first probability based on the characteristic to produce a first weighted probability;

applying, by the one or more processors, a second weight to the second probability based on the characteristic to produce a second weighted probability;

assigning, by the one or more processors, the first identity as a predicted identity of the first item based on the first weighted probability and the second weighted probability;

determining, by the one or more processors, a mismatch between the scanned identity of the first item and the predicted identity of the first item;

generating, by the one or more processors, an alert indicating the mismatch between the scanned identity of the first item and the predicted identity of the first item; and displaying, by the one or more processors, the alert on a display device for viewing by one or more persons.

12. The method of claim 11, wherein applying the first weight to the first probability is based on the first identity having the characteristic.

13. The method of claim 12, wherein applying the second weight to the second probability is based on the second identity lacking the characteristic.

14. The method of claim 11, wherein assigning the first identity to the first item is in response to determining that (i) the first weighted probability exceeds the threshold and (ii) the second weighted probability falls below the threshold.

15. The method of claim 11, further comprising:

determining, based on the first image of the first item, a third probability for a third identity of the first item;

applying a third weight to the third probability based on the characteristic to produce a third weighted probability; and in response to determining that both the first weighted probability and the third weighted probability exceed the threshold, prompting the user to select the first identity or the third identity, wherein assigning the first identity as the predicted identity of the first item is further based on the user selecting the first identity rather than the third identity.

16. The method of claim 15, wherein prompting the user comprises presenting, to the user, a second image for the first identity and a third image for the third identity.

17. The method of claim 16, wherein the first image and the third image are presented in an order based on the first weighted probability and the third weighted probability.

18. The method of claim 15, wherein prompting the user further comprises refraining from presenting, to the user, a fourth image for the second identity in response to determining that the second weighted probability falls below the threshold.

19. The method of claim 11, wherein assigning the first identity as the predicted identity of the first item is further based on at least one of a weight of the first item, an inventory count, or an expiration date.

20. A non-transitory computer readable medium storing instructions that, when executed by a processor, cause the processor to:

obtain a scanned identity of an item based, at least in part, on a scanner scanning an identifier on the item;

capture, by a camera, an image of the item as the identifier is being scanned;

extract information about the item from the image;

determine, based on the information extracted from the image, a probability for an identity of the item;

determine, based on a shopping history of a user purchasing the item, a weight;

apply the weight to the probability to produce a weighted probability;

assign the identity as a predicted identity of the item based on the weighted probability;

determine a mismatch between the scanned identity of the item and the predicted identity of the item;

generate an alert indicating the mismatch between the scanned identity of the item and the predicted identity of the item; and display the alert on a display device for viewing by one or more persons.

* * * * *